United States Patent (10) Patent No.: US 11,306,776 B2
Seko et al. (45) Date of Patent: Apr. 19, 2022

(54) DOUBLE-ROW SELF-ALIGNING ROLLER BEARING

(71) Applicant: NTN CORPORATION, Osaka (JP)

(72) Inventors: Kazumasa Seko, Kuwana (JP); Michio Hori, Kuwana (JP); Yasuyuki Inoue, Kuwana (JP); Takashi Yamamoto, Kuwana (JP); Masaki Nakanishi, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/071,368

(22) Filed: Oct. 15, 2020

(65) Prior Publication Data

US 2021/0025448 A1  Jan. 28, 2021

Related U.S. Application Data

(63) Continuation of application No. PCT/JP2019/016453, filed on Apr. 7, 2019.

(30) Foreign Application Priority Data

Apr. 20, 2018  (JP) .............................. JP2018-081203
Apr. 5, 2019   (JP) .............................. JP2019-072707

(51) Int. Cl.
 *F16C 19/38* (2006.01)
 *F16C 19/50* (2006.01)
 (Continued)

(52) U.S. Cl.
 CPC ............ *F16C 25/08* (2013.01); *F16C 19/385* (2013.01); *F16C 19/505* (2013.01); *F16C 33/36* (2013.01);
 (Continued)

(58) Field of Classification Search
 CPC ...... F16C 19/38; F16C 19/385; F16C 19/505; F16C 23/086; F16C 25/08; F16C 33/36;
 (Continued)

(56) References Cited

U.S. PATENT DOCUMENTS 3,912,346 A * 10/1975 Boratynski ........... F16C 23/086
 384/568
4,828,404 A * 5/1989 Takata .................. F16C 23/086
 384/450

(Continued)

FOREIGN PATENT DOCUMENTS

CN      104641128 A    5/2015
DE  10 2015 204 970 A1  9/2016

(Continued)

OTHER PUBLICATIONS

International Preliminary Report on Patentability for corresponding PCT/JP2019/016453, dated Oct. 29, 2020.

(Continued)

*Primary Examiner* — Marcus Charles

(57) ABSTRACT

Provided is a double-row self-aligning roller bearing including: an inner ring; an outer ring having a spherical raceway surface; and rollers arranged in two rows and interposed between the inner ring and the outer ring, wherein a ratio of a contact angle θ1 in one row to a contact angle θ2 in the other row falls within a range of 0.25≤θ1/θ2≤0.5, and a ratio of distance B1 in a bearing width direction from an end face of the bearing on a side of the one of the rows to an intersection of two lines of action defining the contact angles of the two rows, relative to a distance B2 in the bearing width direction from an end face of the bearing on a side of the other of the rows to the intersection falls within a range of 0.5≤B1/B2≤0.6.

5 Claims, 11 Drawing Sheets

(51) Int. Cl.
*F16C 25/08* (2006.01)
*F16C 33/36* (2006.01)

(52) U.S. Cl.
CPC ...... *F16C 2206/04* (2013.01); *F16C 2240/34* (2013.01); *F16C 2240/54* (2013.01); *F16C 2240/60* (2013.01); *Y02E 10/72* (2013.01)

(58) Field of Classification Search
CPC .............. F16C 2206/04; F16C 2240/34; F16C 2240/54; F16C 2240/60; F16C 2300/14; F03D 80/70; Y02E 10/72
USPC ................ 384/450, 558, 563, 567–569, 572; 416/165 A
See application file for complete search history.

(56) References Cited

U.S. PATENT DOCUMENTS

| | | | | |
|---|---|---|---|---|
| 5,887,984 | A * | 3/1999 | Duval | F16C 33/7886 384/477 |
| 7,918,649 | B2 * | 4/2011 | Nakagawa | F16C 19/505 416/174 |
| 7,922,396 | B2 * | 4/2011 | Mori | F16C 19/50 384/558 |
| 9,046,128 | B2 * | 6/2015 | Silverio | F16C 19/38 |
| 10,180,162 | B2 | 1/2019 | Scheibner et al. | |
| 10,655,674 | B2 | 5/2020 | Yamamoto et al. | |
| 2007/0127858 | A1 | 6/2007 | Nakagawa et al. | |
| 2007/0286544 | A1 * | 12/2007 | Andy | F16C 19/385 384/571 |
| 2007/0297706 | A1 * | 12/2007 | Mori | F16C 23/086 384/558 |
| 2013/0016397 | A1 | 1/2013 | Hoshikawa | |
| 2013/0129269 | A1 * | 5/2013 | Grehn | F16C 23/086 384/450 |
| 2014/0112607 | A1 | 4/2014 | Silverio et al. | |
| 2015/0192174 | A1 | 7/2015 | Shimizu | |
| 2015/0323008 | A1 | 11/2015 | Koganei et al. | |
| 2016/0298687 | A1 * | 10/2016 | Loof | F03D 80/70 |
| 2017/0036259 | A1 | 2/2017 | Yamamoto | |
| 2017/0363146 | A1 | 12/2017 | Koganei et al. | |
| 2018/0023622 | A1 | 1/2018 | Scheibner et al. | |
| 2019/0024712 | A1 | 1/2019 | Yamamoto et al. | |
| 2019/0331164 | A1 * | 10/2019 | Yamamoto | F16C 33/36 |

FOREIGN PATENT DOCUMENTS

| | | | |
|---|---|---|---|
| EP | 1705392 B2 * | 8/2016 | ............ F16C 19/542 |
| EP | 3273077 A1 | 1/2018 | |
| JP | 2004-28139 A | 1/2004 | |
| JP | 2004-92687 A | 3/2004 | |
| JP | 2008-202732 A | 9/2008 | |
| JP | 2010-112527 A | 5/2010 | |
| JP | 2012-219995 A | 11/2012 | |
| JP | 2015-205328 A | 11/2015 | |
| JP | 2016-186355 A | 10/2016 | |
| JP | 2017-150507 A | 8/2017 | |
| JP | 2017-180831 A | 10/2017 | |
| WO | 2005/050038 A | 2/2006 | |
| WO | 2017/164325 A | 9/2017 | |

OTHER PUBLICATIONS

International Search Report dated Jul. 9, 2019 in International Patent Application No. PCT/JP2019/016453.
Extended European Search Report dated Nov. 18, 2021, in European Patent Application No. 19788217.8 (9 pages).
Cao, Rui et al; "Structure dimensions of tapered roller bearing"; Bearing 1990, No. 6, Jun. 5, 1990, pp. 4 to 7; (5 pages).
Zhou, Hai Bo et al; "Control of contact angle of angular ball bearing during grinding"; Bearing 2009, No. 5, May 5, 2009, pp. 25-26; (4 pages).
Wen Yu et al; "Selection of four-row tapered roller bearings with high dynamic load ratings", Bearing 2004 No. 10, Oct. 5, 2004, pp. 45-46 (3 pages).
Notification to Grant Patent Right for Invention dated Jan. 26, 2022 in Chinese Patent Application No. 201980026335.1 (7 pages).

* cited by examiner

DOUBLE-ROW SELF-ALIGNING ROLLER BEARING

CROSS REFERENCE TO THE RELATED APPLICATION

This application is a continuation application, under 35 U.S.C. § 111(a), of international application No. PCT/JP2019/016453, filed Apr. 17, 2019, which claims priority to Japanese patent application No. 2018-081203, filed Apr. 20, 2018, and Japanese patent application No. 2019-072707, filed Apr. 5, 2019, the entire disclosures of all of which are herein incorporated by reference as a part of this application.

BACKGROUND OF THE INVENTION

Field of the Invention

The present invention relates to a double-row self-aligning roller bearing to be applied to a use in which unequal loads are applied to rollers arranged in two rows in a bearing width direction, for example, as a bearing for supporting a main shaft of a wind turbine generator, industrial machinery or the like.

Description of Related Art

On a bearing that supports a main shaft of a wind turbine generator, an axial load due to wind force acts in addition to a radial load due to weights of blades and a rotor head. In the case where the bearing for supporting the main shaft is a double-row self-aligning roller bearing 41 having an axially symmetrical structure as shown in FIG. 20, among rollers 44, 45 in two rows interposed between an inner ring 42 and an outer ring 43, only the rollers 45 in one of the rows that is situated on the rear side with respect to an axial load Fa mainly receive the axial load Fa. In other words, the rollers 45 in the one row receive both radial load and axial load, while the rollers 44 in the other row receive substantially only the radial load. For this reason, the rollers 45 in the row that receives the radial load and axial load have higher contact surface pressures than those of the rollers 44 in the row that receives only the radial load, and thus the rolling surfaces of the rollers 45 and the raceway surface 43a of the outer ring 43 are more susceptible to surface damage or wear. In such a case, the rollers 45 in the one row have shorter rolling fatigue life than that of the rollers 44 in the other row. Therefore, the substantial service life of the entire bearing is limited by the shorter rolling life of the rollers 45 in the row that receives the axial load.

In order to solve this problem, it has been proposed to arrange rollers of different lengths in two rows (see Patent Document 1) or to arrange rollers in two rows at different contact angles (see Patent Document 2) so as to increase the substantial service life of the entire bearing. However, due to requirements of dimensional standards for bearings (ISO Standard; JIS B 1512), it is difficult to increase load capacities of the rollers in the row that receives the axial load to appropriate values by using only one of the two techniques. In other words, since the dimensional standards specify an inner diameter, an outer diameter and a bearing width for each nominal number, the rollers in the row that receives the axial load cannot be too long because the bearing width would exceed a standard value. Similarly, the contact angle of the rollers in the row that receives the axial load cannot be too large because the inner diameter would exceed a standard value.

Thus, in order to equalize the contact surface pressures on the row that receives the axial load and on the row that receives only the radial load, without making the dimensions of respective parts out of the dimensional standards of bearings, it has been proposed to combine the technique of arranging the rollers of different lengths in two rows and the technique of arranging the rollers in the two rows at different contact angles (see Patent Document 3). In this case, since it is important that the contact angle of the rollers in the row that receives the axial load is increased so as to sufficiently increase the load capacities of the rollers, Patent Document 3 also proposes an appropriate ratio of the contact angles of the rollers in the respective rows.

RELATED DOCUMENT

Patent Document

[Patent Document 1] WO 2005/050038
[Patent Document 2] U.S. Patent Application Publication No. 2014/0112607 [Patent Document 3] JP Laid-open Patent Publication No. 2017-180831

SUMMARY OF THE INVENTION

The bearing disclosed in Patent Document 3 makes it possible to equalize contact surface pressures on the respective rows due to fatigue loads applied day-to-day and thereby to improve substantial service life of the entire bearing. However, the adjustment of the above parameters alone may not sufficiently increase the load capacities in the row of the shorter rollers to accommodate an extreme load that is a possible maximum load anticipated to occur in 50 years of service.

An object of the present invention is to provide a double-row self-aligning roller bearing suitable for a use in which the bearing receives an axial load and a radial load and in which loads having mutually different magnitudes act on rollers arranged in two rows in an axial direction, the bearing being capable of suitably distributing not only fatigue loads but also extreme loads between the rollers in the two rows, within the constraint of the dimensional standards.

According to the present invention, a double-row self-aligning roller bearing includes:
an inner ring;
an outer ring having a spherical raceway surface; and
a plurality of rollers arranged in two rows in a bearing width direction and interposed between the inner ring and the outer ring, each of the rollers in the two rows having an outer peripheral surface having a cross-sectional shape matching the raceway surface of the outer ring, wherein
a ratio of a contact angle $\theta_1$ of the rollers in one of the rows to a contact angle $\theta_2$ of the rollers in the other of the rows falls within a range of $0.25 \leq \theta_1/\theta_2 \leq 0.5$, and a ratio of a distance B1 in the bearing width direction from an end face of the bearing on a side of the one of the rows to an intersection of two lines of action defining the contact angles of the two rows, relative to a distance B2 in the bearing width direction from an end face of the bearing on a side of the other of the rows to the intersection falls within a range of $0.5 \leq B1/B2 \leq 0.6$.

According to this configuration, the rollers in the other row are arranged at a larger contact angle than that of the rollers in the one row so that the rollers in the other row can support a larger axial load. Where the double-row self-aligning roller bearing is used under a condition where an axial load and a radial load act, the rollers having the larger contact angle support substantially all the axial load and a part of the radial load, and the rollers having the smaller contact angle support the rest of the radial load. By distributing the axial load and the radial load between the rollers in the two rows in such a share proportion, the contact surface pressures on the rollers in the respective rows can be equalized. Thus, it is possible to secure a large load capacity of the entire bearing as well as to increase the substantial service life of the entire bearing.

Further, a plurality of double-row self-aligning roller bearings having different ratios of contact angles of rollers in respective rows were prepared, and each of the double-row self-aligning roller bearings was analyzed for contact surface pressures on the rollers in the respective rows under an assumed load condition for the case where the bearing is used for supporting a main shaft of a wind turbine generator. As a result, it was found that the bearing having the ratio of the contact angles of 1:3 has the most equalized contact surface pressures on the rollers in the respective rows. The assumed load condition refers to an axial load and a radial load that are fatigue loads when an average wind turbine generator in view of conditions such as its power generation capacity and installation location is most normally operated. Therefore, it is conceivable that an optimum ratio of the contact angles may not be 1:3 in a double-row self-aligning roller bearing used in a wind turbine generator that is different from such an average wind turbine generator in these conditions. However, even in that case, the optimum ratio of the contact angles falls within a range of 1:4 to 1:2. That is, where the ratio of the contact angles of the two rows falls within the range of $0.25 \leq \theta 1/\theta 2 \leq 0.5$, the rollers of the two rows can suitably share the fatigue loads.

Further, the ratio of the distance B1 in the bearing width direction from the bearing end face on the side of the one row having the smaller contact angle to the intersection of the two lines of action defining the contact angles of the two rows, relative to the distance B2 in the bearing width direction from the bearing end face on the side of the other row having the larger contact angle to the intersection falls within the range of $0.5 \leq B1/B2 \leq 0.6$, so that the rollers in the one row that supports substantially only the radial load do not have a too small length and fall within the dimensional standard. Therefore, it is possible to prevent the rollers of the one row from having insufficient load capacities, so that they can accommodate even an extreme load which should be anticipated to be applied from various directions. Therefore, the rollers in the two rows can suitably share loads so as to accommodate either of fatigue loads and extreme loads, within the constraint of the dimensional standards.

In the present invention, a ratio of a length L1 of the rollers in the one of the rows to a length L2 of the rollers in the other of the rows may fall within a range of $0.9 \leq L1/L2 \leq 1.0$. According to this configuration, the length of the rollers in the row that has the larger contact angle is equal to or greater than the length of the rollers in the row that has the smaller contact angle so as to surely improve the load capacities of the rollers in the row that has the larger contact angle to an axial load. In addition, the length of the rollers in the row that has the smaller contact angle is equal to or greater than 90% of the length of the rollers in the other row so as to ensure that the rollers in the one row that supports substantially only the radial load do not have a too small length and fall within the dimensional standard, as discussed above.

In the present invention, an inclination angle $\beta 2$ of a retainer that retains the rollers in the other of the rows may have a relation, relative to a roller maximum diameter angle $\alpha 2$ that is an inclination angle of the rollers in the other of the rows at a point where each of the rollers in the other of the rows has a maximum diameter, expressed by an inequation: $0 \leq \beta 2 \leq \alpha 2$.

Note that the "inclination angle $\beta 2$ of the retainer" refers to an angle formed between e.g. a retainer center line (bearing center axis) and a center line of a cylindrical surface defined by each pocket surface between pillar portions of the retainer. The "inclination angle $\beta 2$ of the retainer" may alternatively be an inclination angle of an outer diameter surface of the retainer or an inclination angle of an inner diameter surface of the retainer.

Since the rollers in the other of the rows, i.e., the rollers in the rear row with respect to an input direction of the axial load, have a larger maximum diameter angle $\alpha 2$, the retainer inclination angle $\beta 2$ may be suitably adjusted such that the pocket surfaces of the retainer can hold the rollers at maximum diameter positions of the rollers.

In that case, where the angles satisfy $0 \leq \beta 2 \leq \alpha 2$, attitude stability of the rollers is not deteriorated.

Such a retainer shape makes it possible to prevent reduction in ease of assembly, which is particular to an asymmetrical left and right row design, and to stably hold the rollers.

In the present invention, each of the rollers may have an outer peripheral surface coated with a DLC coating having a multi-layered structure;

the DLC coating may have a film thickness of 2.0 μm or greater;

a base material of each of the rollers may have a surface roughness of $Ra \leq 0.3$ and a root-mean-square gradient $R\Delta q \leq 0.05$ on an outer surface of the base material; and the DLC coating having the multi-layered structure may include layers each having a film hardness, the film hardness stepwisely increasing toward an external-side layer.

The term "DLC" is an abbreviation for Diamond-like Carbon.

DLC coating treatment on the outer peripheral surfaces of the rollers improves wear resistance. The DLC coating preferably employs a multi-layered structure which provides excellent adhesion to the base material, and the film thickness is preferably 2.0 μm or greater. Also, the outer peripheral surfaces subjected to the DLC coating may have a surface roughness expressed by values of an arithmetic average roughness Ra of 0.3 Ra or smaller and a root-mean-square gradient $R\Delta q$ of 0.05 or smaller so that aggressiveness to an opponent material can be reduced. Further, the film hardness of the DLC coating is stepwisely increased in the multi-layered structure so as to achieve high adhesion.

The double-row self-aligning roller bearing is suitable for supporting a main shaft of a wind turbine generator. Such a double-row self-aligning roller bearing for supporting a main shaft of a wind turbine generator receives a radial load due to weights of blades and a rotor head as well as an axial load due to wind force. Among the rollers arranged in two rows in a bearing width direction, the rollers in one row receive substantially only the radial load, whereas the rollers in the other row receive both the radial load and the axial load. In that case, the rollers in the other row having a larger contact angle can serve as the rollers in the row that receives the axial load, and the rollers in the one row having a smaller contact angle can serve as the rollers in the row that receives substantially only the radial load, so as to suitably share loads between the rollers in the respective rows to accommodate either of fatigue loads and extreme load.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

Figure 1:
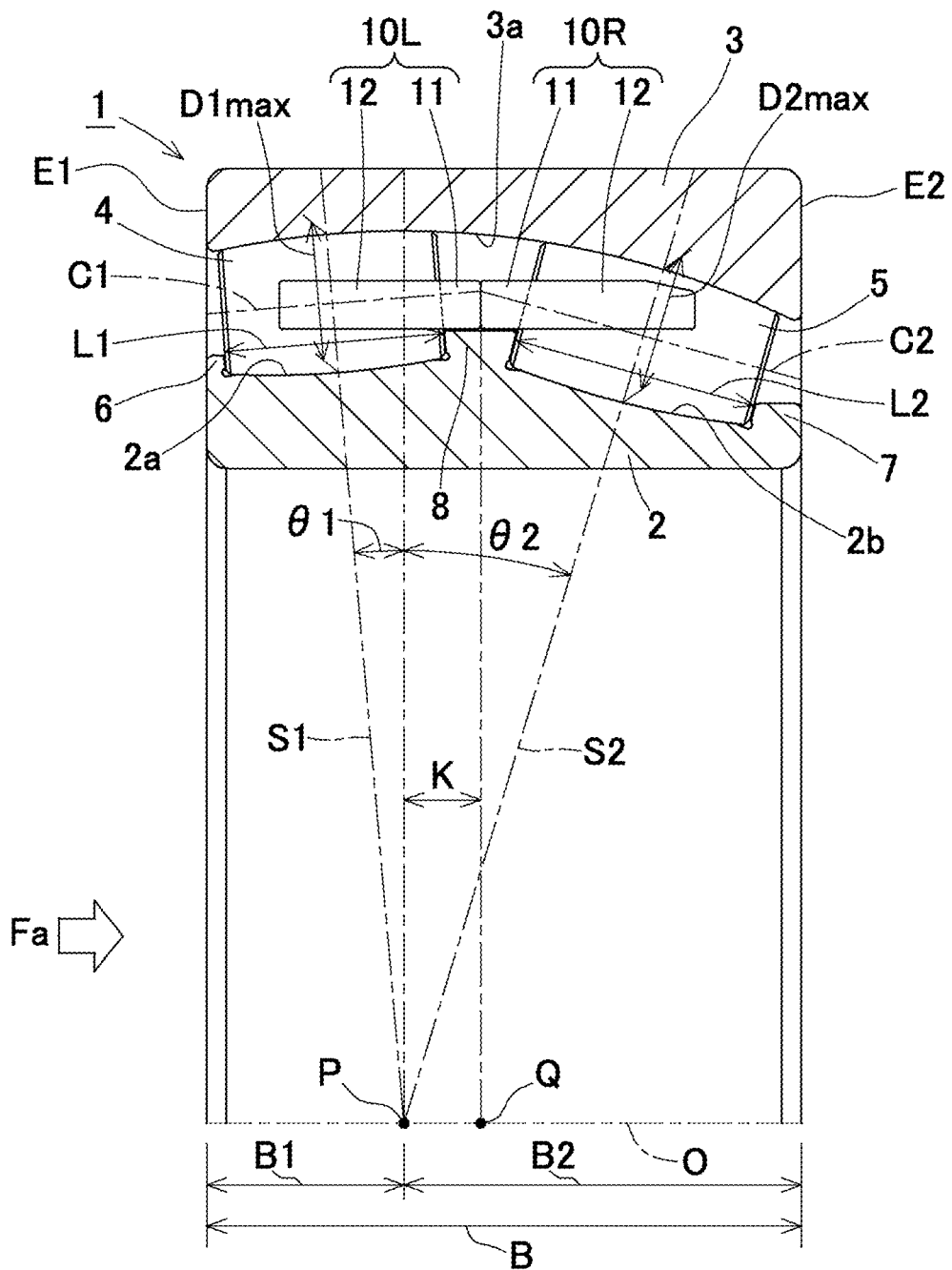
FIG. 1 is a sectional view of a double-row self-aligning roller bearing according to a first embodiment of the present invention.

A double-row self-aligning roller bearing (hereinafter, sometimes simply referred to as "bearing") 1 according to a first embodiment of the present invention will be described with reference to FIG. 1. The double-row self-aligning roller bearing 1 includes: an inner ring 2; an outer ring 3; and rollers 4, 5 arranged in two rows on the left and right sides in a bearing width direction (axis direction) and interposed between the inner ring and the outer ring. The outer ring 3 has a spherical raceway surface 3a, and each of the rollers 4, 5 in the left and right rows has an outer peripheral surface having a cross-sectional shape matching the raceway surface 3a of the outer ring 3. In other words, the outer peripheral surfaces of the rollers 4, 5 are rotation curved surfaces obtained by rotating respective circular arcs matching the raceway surface 3a of the outer ring 3 about center lines C1, C2. The inner ring 2 is formed with raceway surfaces 2a, 2b in double rows having cross-sectional shapes matching the outer peripheral surfaces of the rollers 4, 5 in the respective left and right rows. The inner ring 2 is provided with flanges (small flanges) 6, 7 at opposite ends of its outer peripheral surface. The inner ring 2 is provided with an intermediate flange 8 at a center portion of the outer peripheral surface, that is, at a portion between the rollers 4 in the left row and the rollers 5 in the right row. Note that the terms "left" and "right" used herein merely indicate a relative positional relation in an axial direction of the bearing for the sake of convenience. In this description, the words "left" and "right" correspond to the left and right, respectively, throughout the drawings for ease of understanding.

The rollers 4, 5 in the respective left and right rows are retained by retainers 10L, 10R, respectively. The retainer 10L for the left row includes an annular portion 11 and a plurality of pillar portions 12 extending from the annular portion 11 toward the left side, and the rollers 4 in the left row are retained in pockets between the respective pillar portions 12. The retainer 10R for the right row includes an annular portion 11 and a plurality of pillar portions 12 extending from the annular portion 11 toward the right side, and the rollers 5 in the right row are retained in pockets between the respective pillar portions 12.

Figure 2:
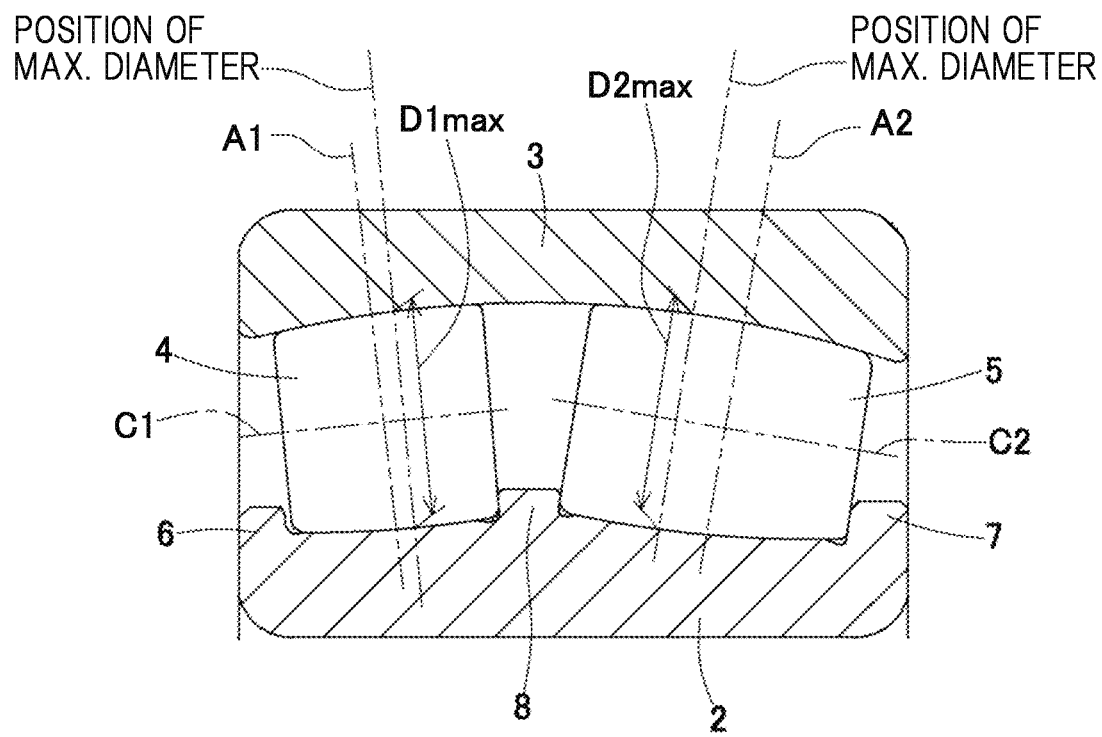
FIG. 2 illustrates asymmetrical rollers.

As exaggeratedly shown in FIG. 2, the rollers 4, 5 in the respective left and right rows are asymmetrical rollers having respective maximum diameters D1max, D2max at positions displaced from centers A1, A2 of the roller lengths thereof. The maximum diameter D1max of the rollers 4 in the left row is located to the right of the center A1 of the roller length, and the maximum diameter D2max of the rollers 5 in the right row is located to the left of the center A2 of the roller length. Induced thrust loads are generated to the rollers 4, 5 in the left and right rows, which are in the form of such asymmetrical rollers. The intermediate flange 8 of the inner ring 2 is provided for receiving the induced thrust loads. A combination of the asymmetrical rollers 4, 5 and the intermediate flange 8 allows the rollers 4, 5 to be guided accurately because the rollers 4, 5 are guided at three locations, i.e. the inner ring 2, the outer ring 3 and the intermediate flange 8.

As shown in FIG. 1, the rollers 4, 5 in the respective rows have contact angles that are greater than 0° and are different from each other. In this example, the contact angle θ2 of the rollers 5 in the right row is greater than the contact angle θ1 of the rollers 4 in the left row. A ratio of the contact angle θ1 of the rollers 4 in the left row to the contact angle θ2 of the rollers 5 in the right row is set within the range of 1:4 to 1:2, i.e., the range of 0.25≤θ1/θ2≤0.5. The most preferable ratio of the contact angles θ1, θ2 is 1:3 (θ1/θ2=0.333), the reason for which will be explained later. Specifically, the contact angle θ1 falls within a range, for example, from 3° to 6° (preferably θ1=5°). The contact angle θ2 falls within a range, for example, from 12° to 18° (preferably θ2=15°).

The rollers 4 in the left row and the rollers 5 in the right row have equal maximum diameters D1max, D2max and different lengths L1, L2 along the center lines C1, C2. The length L2 of the longer rollers 5 is preferably 39% or more of a bearing width B (a distance in the bearing width direction from a bearing end face E1 on the left row side to a bearing end face E2 on the right row side). However, the length L1 of the rollers 4 in the left row and the length L2 of the rollers 5 in the right row may be equal. Having said that, as in the illustrated example, where the length L2 of the rollers in the row that has the larger contact angle is longer than the length L1 of the rollers in the row that has the smaller contact angle, the rollers in the row that has the larger contact angle have even greater load capacities to receive an axial load.

The position of an intersection P in the bearing width direction at which two lines of action S1, S2 defining the contact angles θ1, θ2 of the respective rows intersect is displaced by a distance K toward a side of the rollers 4 having the smaller contact angle from a center position Q of the intermediate flange 8 in the bearing width direction. This makes it possible to increase the contact angle θ2 of the longer rollers 5 without making the longer rollers 5 unnecessarily long. It should be noted that the lines of action S1, S2 are defined as lines along which a synthetic force of forces acting on contact portions between the rollers 4, 5 and the inner and outer rings 2, 3 acts. The point P at which the lines of action S1, S2 intersect is located on a bearing center axis O.

More specifically, the position of the intersection P in the bearing width direction is set such that a ratio of the distance B1 in the bearing width direction from the bearing end face E1 on the side of the left row having the smaller contact angle to the intersection P, relative to the distance B2 in the bearing width direction from the bearing end face E2 on the side of the right row having the larger contact angle to the intersection P falls within the range of 0.5≤B1/B2≤0.6.

A bearing 1 having this configuration may be applied to a use in which the bearing receives an axial load and a radial load, and loads having mutually different magnitudes act on the rollers in the left and right rows (for example, as a bearing for supporting a main shaft of a wind turbine generator). In such a case, the bearing 1 is installed such that the rollers 4 in the left row are located on a side close to rotor blades (on the front side, i.e., the left side in FIG. 1) and the rollers 5 in the right row are located on a side away from the rotor blades (on the rear side, i.e., the right side in FIG. 1). In this case, an axial load Fa from the main shaft is applied in a direction from the front side toward the rear side. Thus, the rollers 5 in the right row that has the larger contact angle θ2 support substantially all the axial load and a part of the radial load, and the rollers 4 in the left row that has the smaller contact angle θ1 support the rest of the radial load.

Where the ratio of the distance B1 to the distance B2 in the bearing width direction falls within the range of 0.5≤B1/B2≤0.6, the length L1 of the rollers in the left row that supports substantially only the radial load is not too short and falls within the dimensional standard. If the rollers in one of the rows have a too small length, the rollers would have insufficient load capacities, which may lead to reduced service life of the bearing due to edge stress occurring at opposite ends of the rollers upon application of a very large load, such as an extreme load, from a radial direction. In contrast, the bearing 1 according to the present embodiment makes it possible to prevent the rollers of the one row from having insufficient load capacities, such that they can accommodate even an extreme load which should be anticipated to be applied from various directions. Therefore, according to the bearing 1, the rollers in the two rows can suitably share loads so as to accommodate either of fatigue loads and extreme loads, within the constraint of the dimensional standards.

Although the length L2 of the rollers in the other row (in this example, in the right row) is preferably longer than the length L1 of the rollers in the one row (in this example, in the left row) as described above, it is more preferable that the ratio of L1 to L2 falls within the range of 0.9≤L1/L2≤1.0 so as not to make the length L1 of the rollers in the left row too short.

Figure 3:
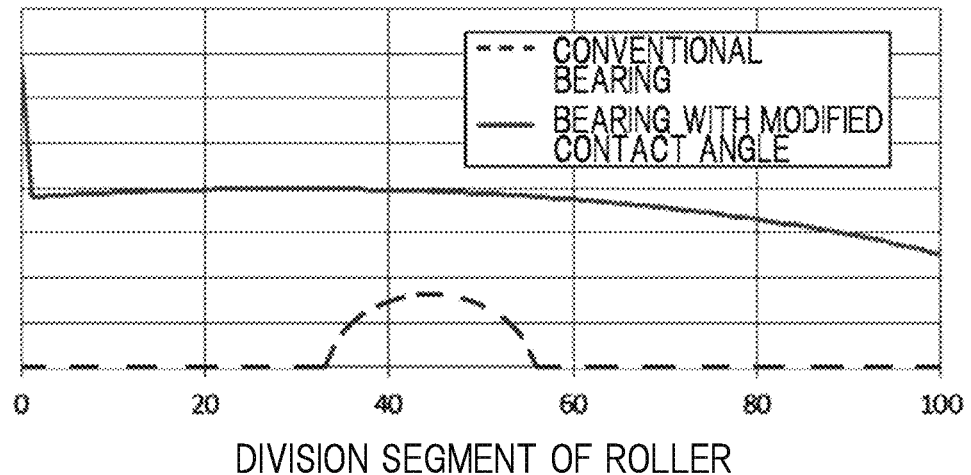
FIG. 3 is a graph showing analytical results of distributions of contact surface pressure on the rollers on the front sides when a synthetic load of an axial load and a radial load is applied to the double-row self-aligning roller bearing and a conventional double-row self-aligning roller bearing.

Below is the reason why the ratio of the contact angles of the rollers in the two rows should fall within the range from 0.25 to 0.5. For a conventional double-row self-aligning roller bearing 41 shown in FIG. 10 and the double-row self-aligning roller bearing 1 of the present invention shown in FIG. 1, contact surface pressures on the rollers in the left and right rows were analyzed under a synthetic load of an axial load and a radial load assumed for the case where each bearing is used for supporting a main shaft of a wind turbine generator. FIG. 3 shows contact surface pressure distributions on the rollers on the front sides, i.e. the rollers 44, 4 on in the left rows, and FIG. 4 shows the analytical result of contact surface pressure distributions on the rollers on the rear sides, i.e. on the rollers 45, 5 in the right rows.

Figure 4:
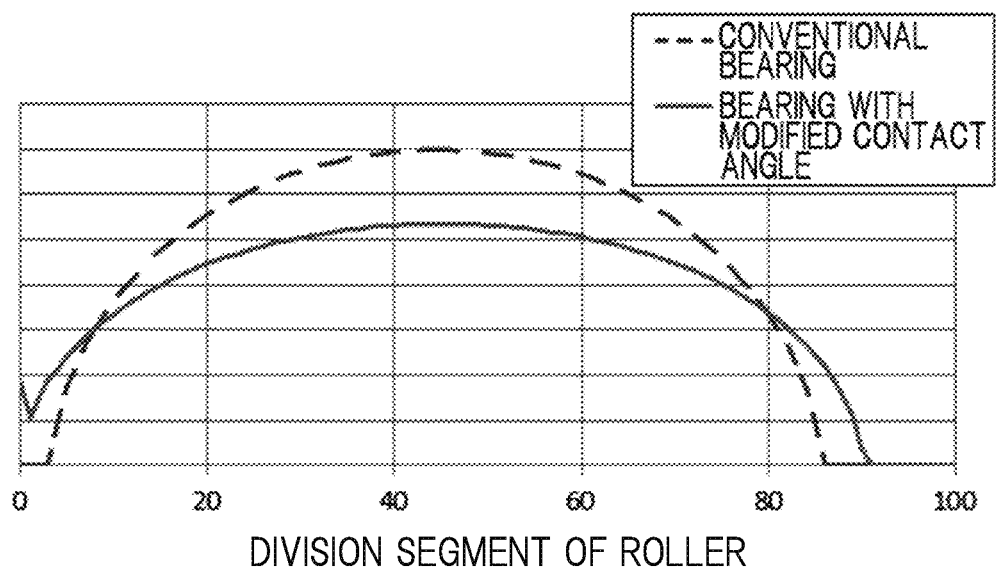
FIG. 4 is a graph showing analytical results of distributions of contact surface pressure on the rollers on the rear sides when a synthetic load of an axial load and a radial load is applied to the double-row self-aligning roller bearing and a conventional double-row self-aligning roller bearing.

From the results in FIG. 3 and FIG. 4, the following is revealed. The conventional bearing in FIG. 10 has lower contact surface pressures on the front side and higher contact surface pressures on the rear side, and thus loads are unequally shared between the front side and the rear side. In contrast, the bearing with modified contact angles in FIG. 1 has equalized contact surface pressures with reduced difference between the contact surface pressures in respective rows because the contact surface pressures are distributed over the entirety of the rollers on the front side, reducing a maximum value of the contact surface pressures on the rear side.

Figure 5:
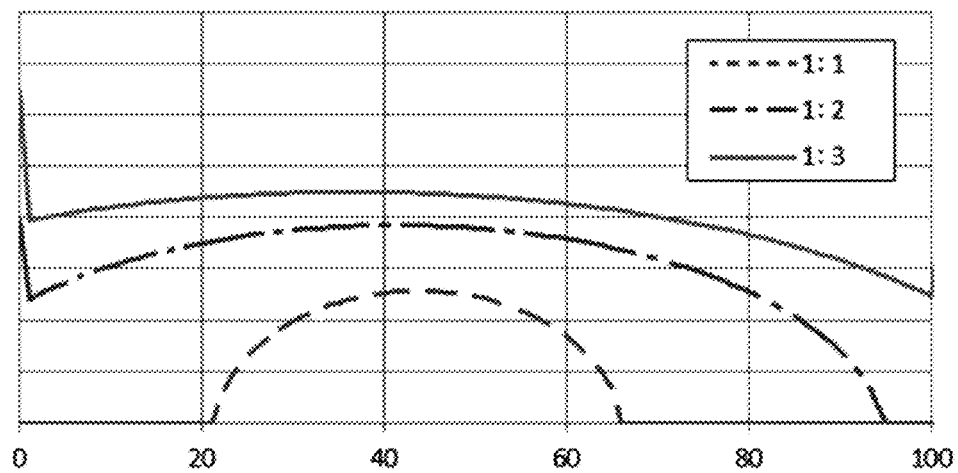
FIG. 5 is a graph showing analytical results of distributions of contact surface pressure on the rollers on the front sides when a synthetic load of an axial load and a radial load is applied to plural types of double-row self-aligning roller bearings having different ratios of contact angles of rollers in respective rows.
Figure 6:
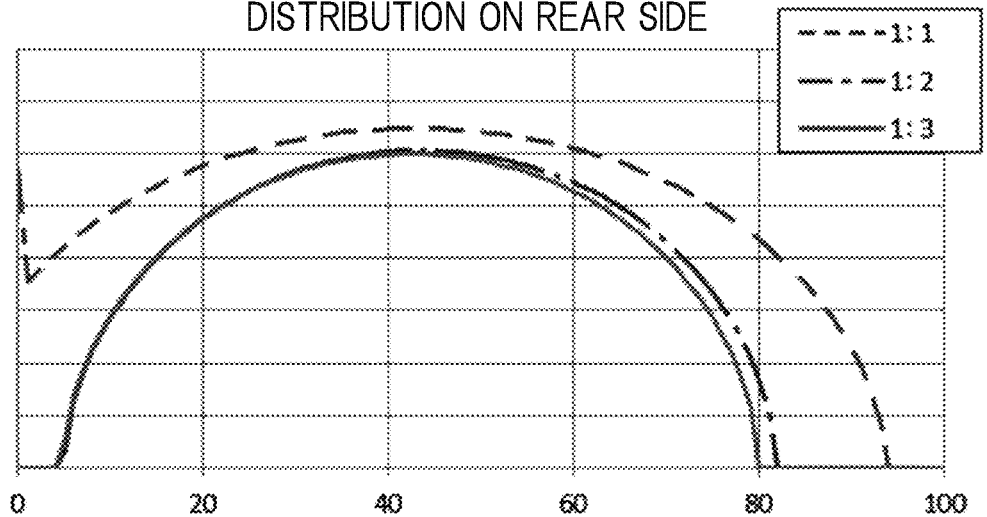
FIG. 6 is a graph showing analytical results of distributions of contact surface pressure on the rollers on the rear sides when a synthetic load of an axial load and a radial load is applied to plural types of double-row self-aligning roller bearings having different ratios of contact angles of rollers in respective rows.

Three types of double-row self-aligning roller bearings each having a different ratio of the contact angle θ1 of the rollers 4 in the left row and the contact angle θ2 of the rollers 5 in the right row were prepared, and contact surface pressures on the rollers in the left and right rows were analyzed in the same way. FIG. 5 shows the analytical result of contact surface pressure distributions on the rollers on the front sides, i.e. on the rollers 4 in the left rows, and FIG. 6 shows the analytical result of contact surface pressure distributions on the rollers on the rear sides, i.e. on the rollers 5 in the right rows. The bearing having the ratio of the contact angles of 1:1 is a conventional one, and the bearings having the ratios of the contact angles of 1:2, 1:3 are those of the present invention which have modified contact angles.

From the results in FIG. 5 and FIG. 6, the following is revealed. When the contact surface pressure distributions are compared for the respective ratios of the contact angles, the bearing having the ratio of the contact angles of 1:3 has the most equalized contact surface pressures between the front side and the rear side. The bearing having the ratio of the contact angles of 1:2 is less equalized when compared with the bearing having the ratio of the contact angles of 1:3 but is sufficiently equalized when compared with the bearing having the ratio of the contact angles of 1:1. As can be seen from FIG. 1, if the contact angle θ2 of the rollers 5 is made larger, it becomes difficult to dispose the longer rollers 5 because the thickness of the inner ring 2 is made too thin due to the dimensional constraint. In view of these, it is desirable to set the ratio of the contact angles to be equal to or greater than 1:4 and equal to or less than 1:2.

It should be noted that the assumed axial load and radial load refer to an axial load and a radial load that are fatigue loads when an average wind turbine generator in view of conditions such as its power generation capacity and installation location is most normally operated. Therefore, it is conceivable that an optimum ratio of the contact angles may not be 1:3 in a double-row self-aligning roller bearing in the case where the double-row self-aligning roller bearing is used in a wind turbine generator that is different from such an average wind turbine generator in these conditions. However, even in such a case, the optimum ratio of the contact angles falls within a range of 1:4 to 1:2.

Figure 7:
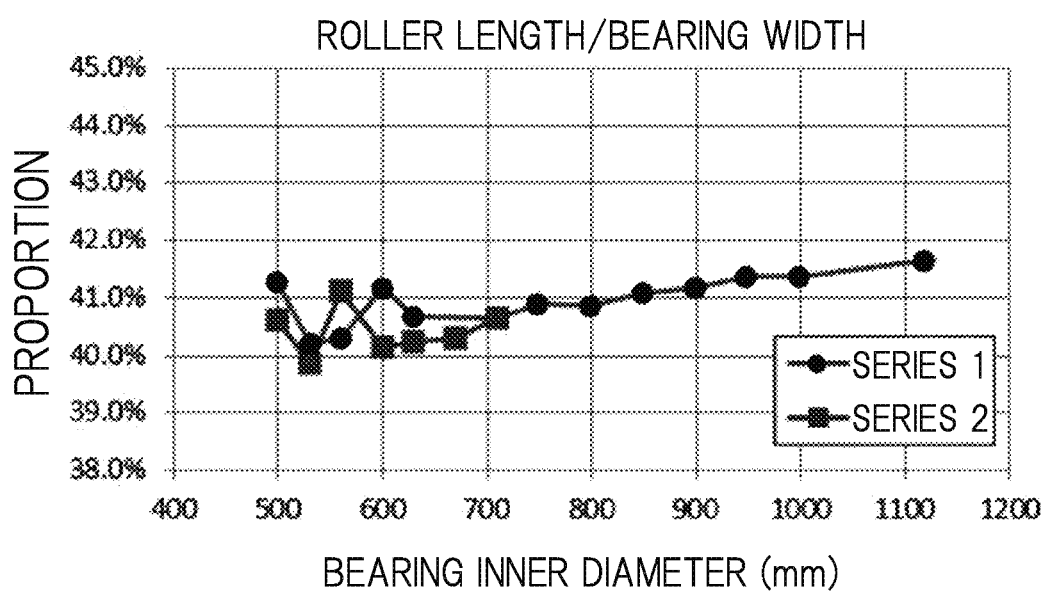
FIG. 7 shows ratios of roller lengths to bearing widths for plural types of conventional double-row self-aligning roller bearings in the same graph.

Although not essential, a condition that the length L2 of the longer rollers 5 is equal to or greater than 39% of the bearing width B may be added so as to provide a double-row self-aligning roller bearing that falls within the dimensional standards and has a ratio of the contact angles of the rollers in the respective rows within the above appropriate range. From an investigation of the proportion of the length L2 of the rollers 5 relative to the bearing width B in conventional double-row self-aligning roller bearings, it was found that the proportion is equal to or greater than 39%, as shown in FIG. 7. The dimensional standards specify an inner diameter, an outer diameter and a bearing width.

Figure 8:
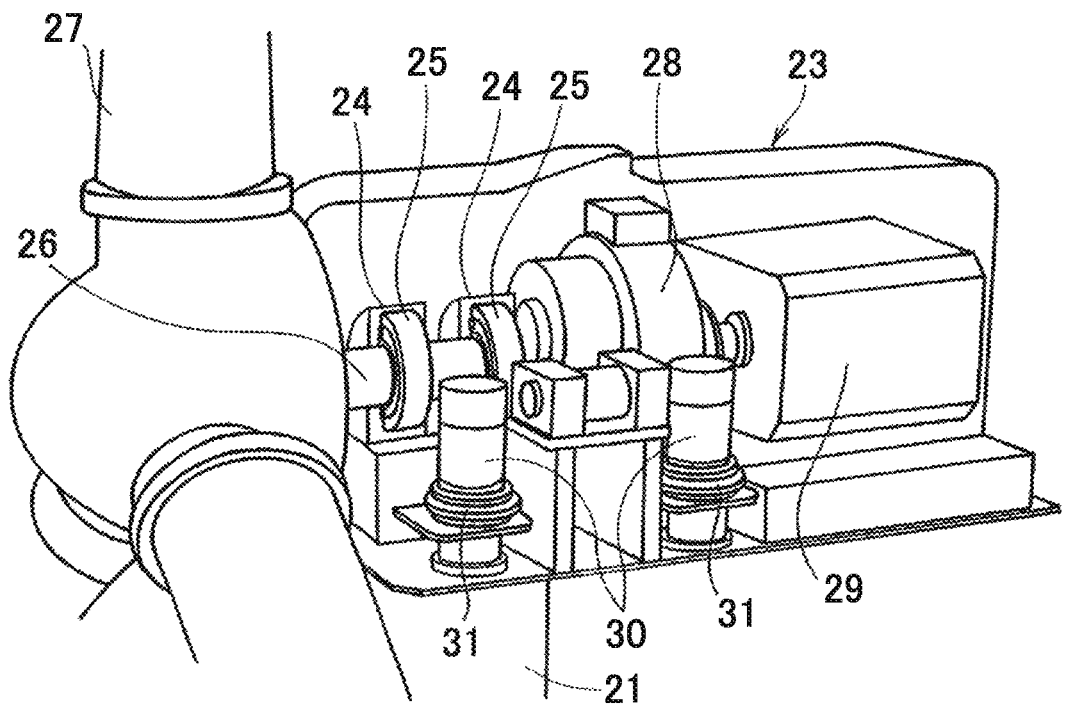
FIG. 8 is a partial perspective view of an example of a main shaft support device of a wind turbine generator.
Figure 9:
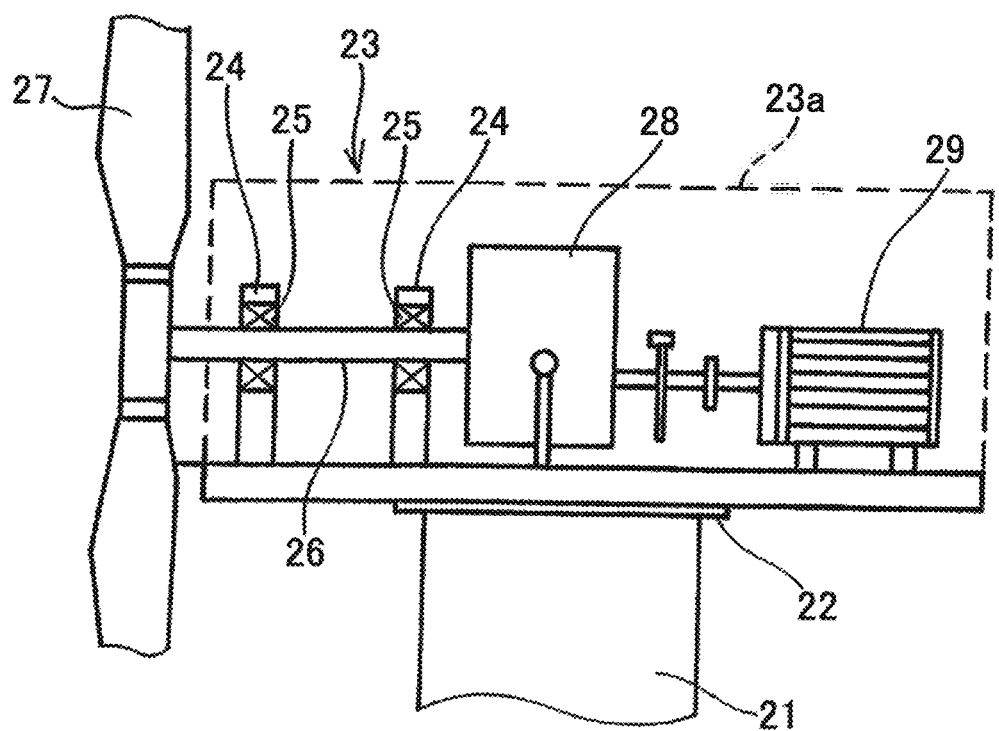
FIG. 9 is a cutaway side view of the main shaft support device.

FIG. 8 and FIG. 9 illustrate an example of a main shaft support device of a wind turbine generator. A casing 23a of a nacelle 23 is horizontally turnably disposed on a support 21 via a revolving seat bearing 22 (FIG. 9). A main shaft 26 is rotatably fitted within the casing 23a of the nacelle 23 via main shaft support bearings 25 disposed in bearing housings 24, and blades 27 that serve as rotor blades are attached to a portion of the main shaft 26 projected outside of the casing 23a. The other end of the main shaft 26 is connected to a speed increasing gear 28, and an output shaft of the speed increasing gear 28 is coupled to a rotor shaft of a power generator 29. The nacelle 23 is revolved to any angle by revolving motors 30 via reduction gears 31. The illustrated example has two main shaft support bearings 25 arranged in series but may have a single main shaft support bearing.

Figure 10:
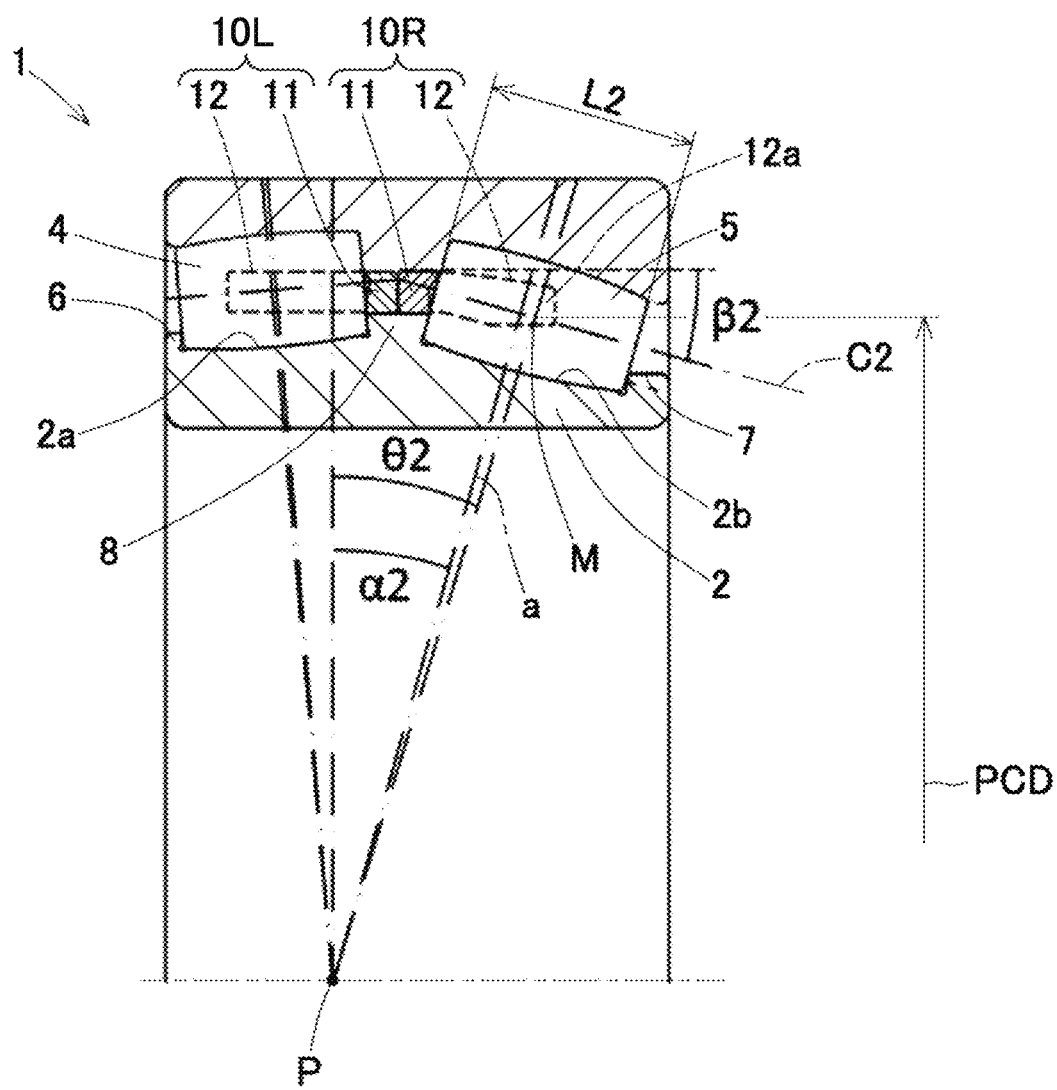
FIG. 10 is a sectional view of a double-row self-aligning roller bearing according to another embodiment of the present invention.
Figure 11:
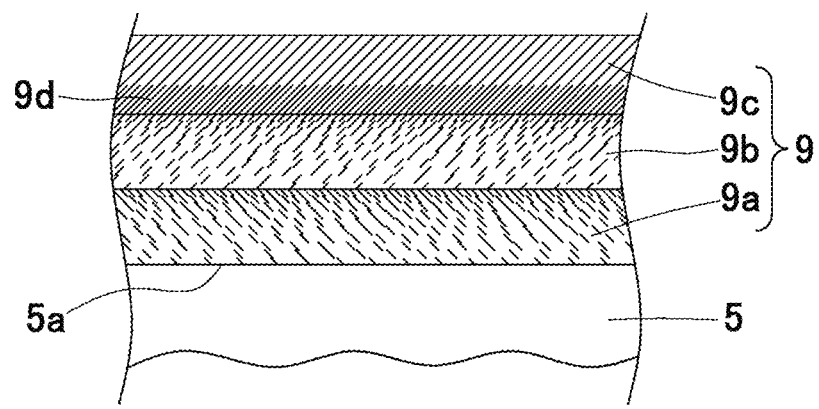
FIG. 11 illustrates features of a DLC coating on a surface layer of a roller of the double-row self-aligning roller bearing.

FIG. 10 and FIG. 11 show another embodiment according to the present invention. This embodiment is the same as the first embodiment, except for the features specifically described below.

In a double-row self-aligning roller bearing 1 according to this embodiment, an inclination angle β2 of a retainer 10R that retains the rollers 5 in the other row has a relation expressed as $0 \leq \beta2 \leq \alpha2$ relative to a roller maximum diameter angle α2 that is an inclination angle of the rollers 5 in the other row at a point where each of the rollers 5 in the other row has a maximum diameter.

Note that the "inclination angle β2 of the retainer 10R" refers to an angle formed between e.g. a retainer center line (bearing center axis O) and a center line C2 of a cylindrical surface defined by each pocket surface 12a between pillar portions 12 of the retainer 10R. The "inclination angle β2 of the retainer" may alternatively be an inclination angle of an outer diameter surface of the retainer 10R or an inclination angle of an inner diameter surface of the retainer 10R.

Since the rollers 5 in the other row, i.e., the rollers 5 in the rear row with respect to an input direction of the axial load, have a larger maximum diameter angle α2, the retainer inclination angle β2 may be suitably adjusted such that the pocket surfaces 12a of the retainer 10R can hold the rollers 5 at maximum diameter positions of the rollers.

In that case, where the angles satisfy $0 \leq \beta2 \leq \alpha2$, attitude stability of the rollers 5 is not deteriorated.

Such a shape of the retainer 10R makes it possible to prevent reduction in ease of assembly, which is particular to an asymmetrical left and right row design, and to stably hold the rollers 5.

Each of the rollers 4, 5 in the respective rows has an outer peripheral surface coated with a DLC coating 9 having a multi-layered structure (3 or more layers). Although the DLC coating 9 may be applied to the raceway surfaces 2a, 2b, 3a of the inner ring 2 and the outer ring 3 in the same manner as that of the rollers 4, 5, the following description is made with reference to the DLC coating 9 on the rollers 4, 5. The DLC coating 9 has a film thickness of 2.0 μm or greater. In this embodiment, the DLC coating 9 includes three layers, namely, a base layer 9a, a mixed layer 9b, and a surface layer 9c provided sequentially from the base material side of the rollers 4, 5, as schematically shown in the cross section of the DLC coating 9 of a roller 5 on the rear side in FIG. 11.

The base material of each of the rollers 4, 5 has a surface roughness expressed by an arithmetic roughness Ra≤0.3 and a root-mean-square gradient RΔq≤0.05 on an outer surface of the base material.

The DLC coating 9 having the multi-layered structure includes the layers 9a, 9b, 9c each having a film hardness which increases stepwise toward an external-side layer.

DLC coating treatment on the outer peripheral surfaces of the rollers 4, 5 improves wear resistance. Application of the DLC coating 9 improves wear resistance on the one hand, but it entails sufficient peeling resistance on the other hand. Peeling resistance is improved by the following features. The DLC coating 9 employs a multi-layered structure which provides excellent adhesion to the base material. The film thickness is preferably 2.0 μm or greater. Also, the outer peripheral surfaces subjected to the DLC coating 9 have a surface roughness expressed by values of an arithmetic average roughness Ra of 0.3 Ra or smaller and a root-mean-square gradient RΔq of 0.05 or smaller so that aggressiveness to an opponent material can be reduced. Further, the film hardness of the DLC coating 9 is stepwise increased in the multi-layered structure so as to achieve high adhesion.

The material of the rollers 4, 5 and the DLC coating 9 will be specifically described. The rollers 4, 5, the inner ring 2 and the outer ring 3 are made of a ferrous material. The ferrous material may be any steel material that is commonly used for bearing components and may include, for example, high carbon chromium bearing steel, carbon steel, tool steel, and martensite stainless steel.

These bearing components preferably have a Vickers hardness of Hv 650 or higher on their surfaces on which the DLC coating 9 is to be formed. A hardness of Hv 650 or higher can reduce a hardness difference between the base material surfaces and the DLC coating 9 (base layer) so as to improve adhesion.

Prior to formation of the coating film, a nitride layer is preferably formed by nitriding treatment on the surfaces of the rollers 4, 5 on which the DLC coating 9 is to be formed.

As the nitriding treatment, plasma nitriding treatment may be preferably carried out which hardly generates an oxide layer that impedes adhesion on the base material surfaces. It is preferable that the surfaces after nitriding treatment have a Vickers hardness of Hv 1000 or higher so as to further enhance adhesion between the base material surfaces and the DLC coating 9 (base layer).

The base material surfaces of the rollers 4, 5 on which the DLC coating 9 is to be formed, i.e., on which the base layer 9a is to be formed, have an arithmetic average roughness Ra from 0.1 to 0.3 μm and a root-mean-square gradient RΔq of 0.05 or smaller. RΔq is preferably 0.03 or smaller, and more preferably 0.02 or smaller. The arithmetic average roughness Ra and the root-mean-square gradient RΔq are calculated in accordance with JIS B 0601 and are measured using a contact or non-contact type surface roughness tester. The following specific measurement condition is used: measurement length 4 mm, cutoff 0.8 mm. The base material surfaces having a root-mean-square gradient RΔq of 0.05 or smaller have a gentle peak in a roughness curve and include protrusions having a larger radius of curvature so that local surface pressure can be reduced. Such base material surfaces can also suppress electrical field concentration at a microscopic-level due to roughness during film formation and prevent local change in film thickness and hardness, thereby improving peeling resistance of the hard coating.

Each base material surface preferably has a maximum ridge height Rp which is determined from a roughness curve of the base material surface of 0.4 μm or smaller. The maximum ridge height Rp is determined in accordance with JIS B 0601. The relation between the maximum ridge height Rp determined from the roughness curve and the arithmetic average roughness Ra preferably satisfies 1≤Rp/Ra≤2, and more preferably 1.2≤Rp/Ra≤2.

The base material surface preferably has a negative skewness Rsk which is determined from the roughness curve. Rsk is an indicator of a degree of distortion and is more preferably −0.2 or lower. Skewness Rsk quantitatively represents the vertical symmetry of an amplitude distribution curve about its mean line, i.e., serves as an indicator of a deviation of the surface roughness from the mean line. Skewness Rsk is determined in accordance with JIS B 0601. A negative value of skewness Rsk indicates that the roughness curve is shaped so as to extend downward (i.e., to define valleys), indicating that the surface has many flat portions. Consequently, the surface has fewer protrusions and is unlikely cause stress concentration due to the projections. Although a technique of reducing roughness such as barrel finishing may be used to remove surface projections by collisions with polishing medium, care should be taken because new protrusions may be formed depending on the processing condition, which may lead to the surface having a positive Rsk.

FIG. 11 is a schematic sectional view illustrating the structure of the DLC coating 9. As shown in FIG. 11, the DLC coating 9 has a three-layered structure including: (1) a base layer 9a directly formed on a surface of each roller 4, 5 and mainly containing Cr and WC; (2) a mixed layer 9b formed on the base layer 9a and mainly containing WC and DLC; and (3) a surface layer 9c formed on the mixed layer 9b and mainly containing DLC. The mixed layer 9b is formed such that the content of WC in the mixed layer is continuously or stepwisely decreases from the base layer 9a side to the surface layer 9c side, while the content of DLC in the mixed layer continuously or stepwisely increases. In the present embodiment, the DLC coating 9 employs the above-described three-layered structure as its film structure so as to avoid sharp change in physical properties (hardness, elastic modulus).

Since the base layer 9a contains Cr, it is compatible with the base material made of a cemented carbide material or a ferrous material and provides excellent adhesion to the base material in comparison with cases where W, Ti, Si, or Al is used. In addition, WC used in the base layer 9a has a hardness and an elastic modulus intermediate between those of Cr and DLC and hardly causes residual stress concentration after film formation. Further, the base layer 9a preferably has a gradient composition having a decreasing content of Cr and an increasing content of WC from the roller surface side to the mixed layer 9b side. This provides excellent adhesion on the both surfaces facing the roller surface and the mixed layer 9b.

The mixed layer 9b is an intermediate layer interposed between the base layer and the surface layer. As discussed above, WC used in the mixed layer 9b has a hardness and an elastic modulus intermediate between those of Cr and DLC and hardly causes residual stress concentration after film formation. The mixed layer 9b has a gradient composition having a decreasing content of WC and an increasing content of DLC from the base layer 9a side to the surface layer 9c side so that the mixed layer has excellent adhesion on the both surfaces facing the base layer 9a and the surface layer 9c. Also, WC and DLC are physically bonded in the mixed layer so that breakage in the mixed layer can be prevented. Further, the higher content of DLC on the surface layer 9c side contributes to excellent adhesion between the surface layer 9c and the mixed layer 9b. The mixed layer 9b is a layer which serves to bond highly non-adhesive DLC to the base layer 9a side by the presence of WC due to the anchor effect.

The surface layer 9c is a film that mainly contains DLC. The surface layer 9c preferably includes a gradient layer portion 9d which is located on the side adjacent to the mixed layer 9b and has continuously or stepwisely increasing hardness from the mixed layer 9b side. This portion can be formed by continuously or stepwisely changing (increasing) a bias voltage so as to avoid a sharp change in the bias voltage, where different bias voltages are applied to the mixed layer 9b and to the surface layer 9c. The gradient layer portion 9d has a graded hardness as a consequence of changing the bias voltage in such a manner. The reason why the hardness increases continuously or stepwisely is that a composition ratio of the graphite structure ($SP^1$) and the diamond structure ($SP^3$) in the DLC structure shifts toward the latter due to the increasing bias voltage. This eliminates a large hardness difference between the mixed layer and the surface layer, further enhancing the adhesion between the mixed layer 9b and the surface layer 9c.

The DLC coating 9 preferably has a film thickness (total thickness of the three layers) from 0.5 to 3.0 μm. A coating having a film thickness below 0.5 μm may be poor in wear resistance and mechanical strength, whereas a coating having a film thickness above 5.0 μm may be easily peeled off. Further, a proportion of the thickness of the surface layer 9c in the film thickness of the DLC coating 9 is preferably 0.8 or lower. Where the proportion exceeds 0.8, the gradient structure for physically bonding WC and DLC in the mixed layer 9b tends to be discontinuous, leading to deterioration of adhesion.

The DLC coating 9 having the three-layered structure including the base layer 9a, the mixed layer 9b, and the surface layer 9c of the above compositions provides excellent peeling resistance.

FIG. 12 to FIG. 19 show an exemplary configuration of the retainer 10R on the rear side. The retainer 10L (FIG. 1) on the front side shares common features, which will be described below with reference to FIG. 12 to FIG. 19, with the retainer 10R on the rear side in the features, and overlapping description is omitted. Also, the retainer 10R having the exemplary configuration may be applied either to the first embodiment or the embodiment of FIG. 10.

Figure 12:
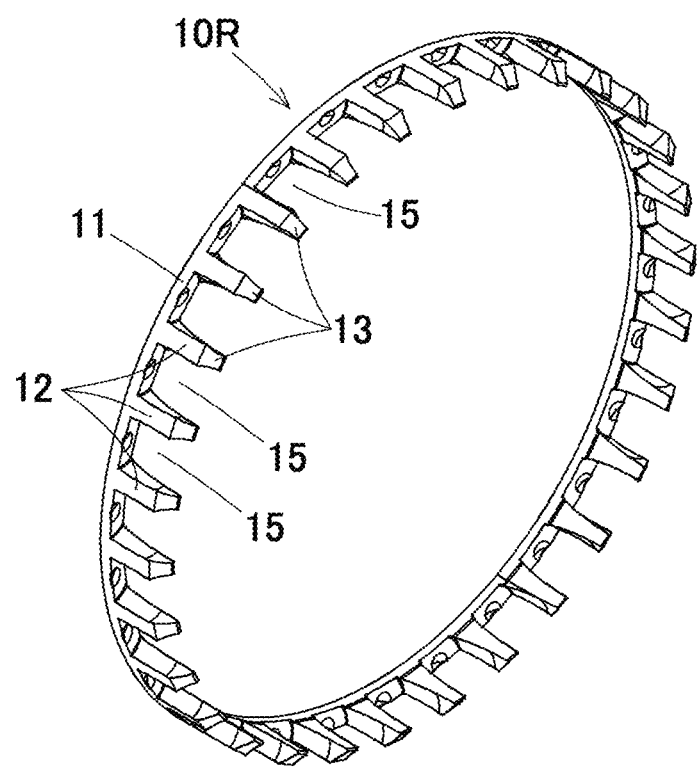
FIG. 12 is a perspective view of an example of a retainer for a double-row self-aligning roller bearing according to one of the embodiments.
Figure 17:
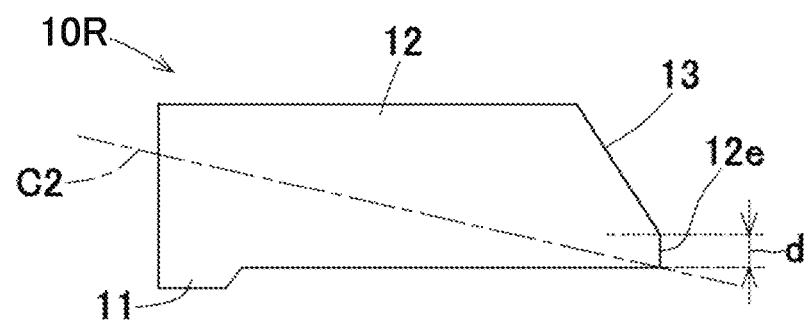
FIG. 17 is a sectional view of a pillar portion of the retainer.
Figure 18:
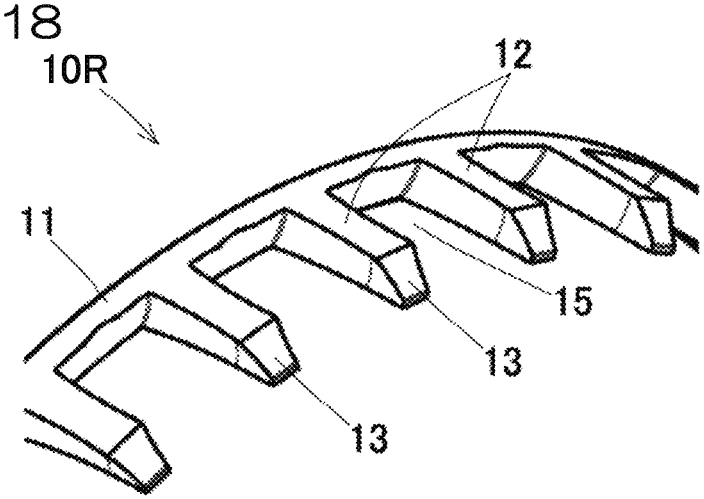
FIG. 18 is a partial perspective view of the retainer.

In FIG. 12, each pillar portion 12 of the retainer 10R has a lengthwise portion that is shaped from a columnar portion having a same basic cross-sectional shape (a shape illustrated in FIG. 14 with imaginary lines) by cutting so as to have a cylindrical pocket surface 12a and is provided with a tapered portion 13 at the tip end thereof. The basic cross-sectional shape is defined by an outer peripheral surface 12b and an inner peripheral surface 12c each defining a part of a cylindrical surface and flat side surfaces 12d extending in the radial direction on opposite sides. The cylindrical surface defining the pocket surface 12a has a diameter slightly larger than the maximum diameter of each roller 5. The pocket surface 12a is a cylindrical surface about the center line C2 (FIG. 1, FIG. 10). As shown in FIG. 17, the center line C2 is inclined with respect to the direction of extension of the pillar portion 12 such that the tip end of each pillar portion extends toward the inner diameter side.

Figure 13:
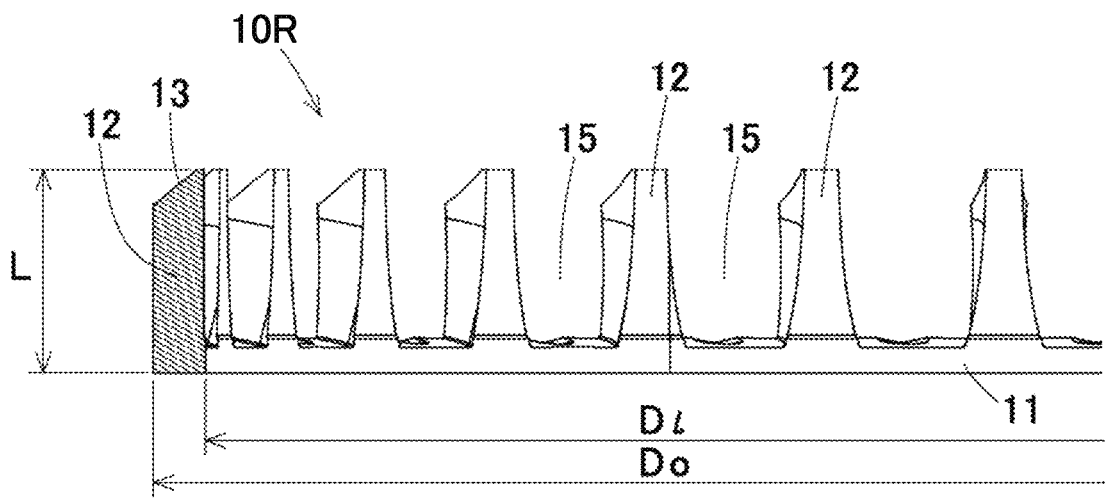
FIG. 13 is a partially enlarged cutaway plan view of the retainer.
Figure 14:
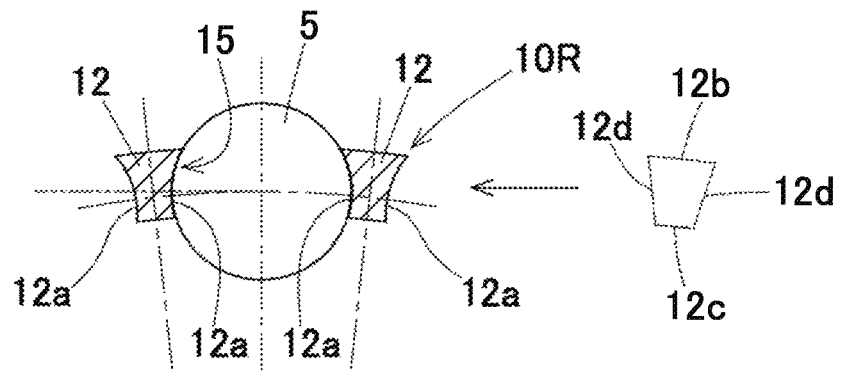
FIG. 14 is a sectional view showing a relation between a pocket of the retainer and a roller.
Figure 15:
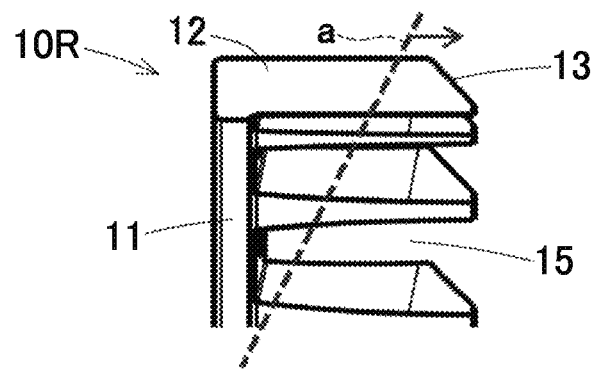
FIG. 15 is a partial sectional view of the retainer.

The retainer 10R shown in FIG. 13 has an outer diameter Do, an inner diameter Di, and a pillar portion length L that are optimized as follows.

The outer diameter Do of the annular portion 11 of the retainer 10R is larger than a pitch circle diameter PCD of the row of the rollers 5, and the inner diameter Di of the annular portion 11 is smaller than the pitch circle diameter PCD (FIG. 10).

The outer diameter Do of the annular portion 11 is, for example, PCD×102 to 105%.

The inner diameter Di of the annular portion 11 is, for example, PCD×95 to 98%.

The length L of each pillar portion 12, specifically, the length L of each of parts of the pillar portions 12 that define pockets 7, is equal to or smaller than 65% of the length L2 of the rollers (FIG. 1, FIG. 10).

Each tapered portion 13 (FIG. 12 to FIG. 13, FIG. 15 to FIG. 17) is formed on the outer diameter surface at the tip end of each pillar portion 12 so as to be inclined toward a retainer inner diameter side as it reaches a distal-most end of the pillar portion. The tapered portion 13 starts at a position on a line "a" (illustrated in FIG. 15 with a dashed line) that extends so as to form the maximum diameter angle of the rollers 5 or at a position on the side of the tip end of each pillar portion with respect to the line "a." In other words, the tapered portion 13 starts at a position M (FIG. 10) on the center line C2 at which each roller 5 has its maximum diameter or at a position on the side of the tip end of each pillar portion with respect to the position M.

Figure 16:
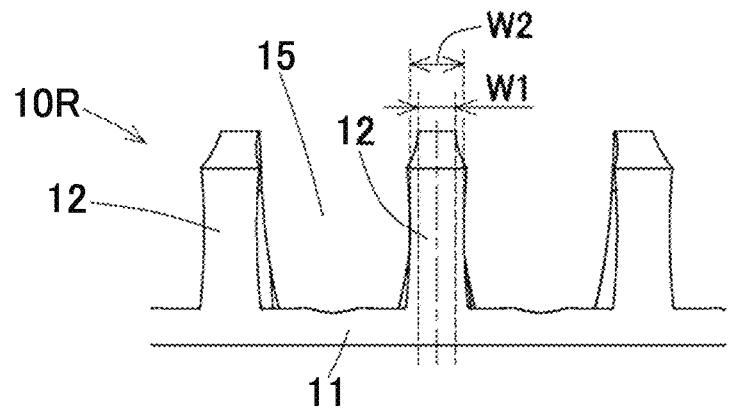
FIG. 16 is a partial plan view of the retainer.

The pillar portions 12 are formed with the tapered portions 13 and the cylindrical pocket surfaces 12a are inclined with respect to the axial direction in which the pillar portions 12 extend, so that each pillar portions has a narrowest width W1 at the distal-most end of the pillar portion 12 and is narrower than a width W2 immediately before the point where the tapered portion 13 starts, when the pillar portion 12 is seen from outside in the retainer radial direction toward the retainer center side as shown in FIG. 16. Also, the pillar portion 12 has a tip end face 12e having a small radial thickness d (FIG. 17).

The retainers 10L, 10R may be made of bearing steel or any other ferrous material, or a brass-based material.

According to the retainer 10R having this configuration, the cylindrical pocket surfaces 12a of the pillar portions 12 allow the rollers 5 to be securely retained. Also, provision of the tapered portions 13 improves ease of assembly of the rollers 5.

The relation between the tapered portions 13 and ease of assembly of the rollers 5 will be described. The center line C2 of each cylindrical surface that defines the pocket surface 12a of the pillar portion 12 is inclined with respect to the direction of extension of the pillar portion 12 such that the tip end of the pillar portion extends toward the inner diameter side. For this reason, where the tapered portions 13 (see FIG. 18) are not provided as in the example of FIG. 19, each pillar portion has a largest width at the distal-most end of the pillar portion when the pillar portion 12 is viewed from outside in the retainer radial direction toward the retainer center side. Therefore, the outer diameter portions at the tip ends of the wide pillar portions 12 hinder smooth insertion of the rollers 5 into the pockets 15, and the outer diameter portions at the tip ends of the wide pillar portions 12 are unnecessary portions that do not provide any good effect on its strength and/or functions.

In this embodiment, the tip end of each pillar portion has a reduced radial width W1 (FIG. 16) and a reduced radial thickness d (FIG. 17) due to provision of the tapered portion 13. This can improve ease of assembly of the rollers 5 and reduce the weight of the retainer 10R. Improvement in ease of assembly of the rollers 5 eliminates the necessity of largely deforming the retainer 10R upon assembling, so that shape distortion due to the deformation of the retainer 10R can be prevented.

It is preferable to provide the tapered portions 13 because the tapered portions 13 are formed so as to eliminate the unnecessary portions and thus do not influence retainment of the rollers 5 and because they achieve weight reduction.

However, since too long tapered portions 13 would deteriorate retainment of the rollers 5, each of the tapered portions starts at a position M (FIG. 16) at which each roller 5 has its maximum diameter or at a position on the side of the tip end of the pillar portion with respect to the position M. Thus, the rollers 5 are securely retained.

In view of ease of assembly of the rollers 5, each tip end of the tapered portions 13 preferably has a radial thickness d (FIG. 17) as small as possible. However, since it is necessary to keep plain surfaces at the tip ends in order to form the cylindrical pocket surfaces 12a from the tip end side of the pillar portions 12 by drilling, it is preferable to make each tapered portion as thin as possible without hindering processing.

Although the description is made with reference to the retainer 10R on the rear side, the retainer 10L on the front side has the same features of the retainer shape and provides the same advantages as those of the retainer 10R on the rear side.

Figure 19:
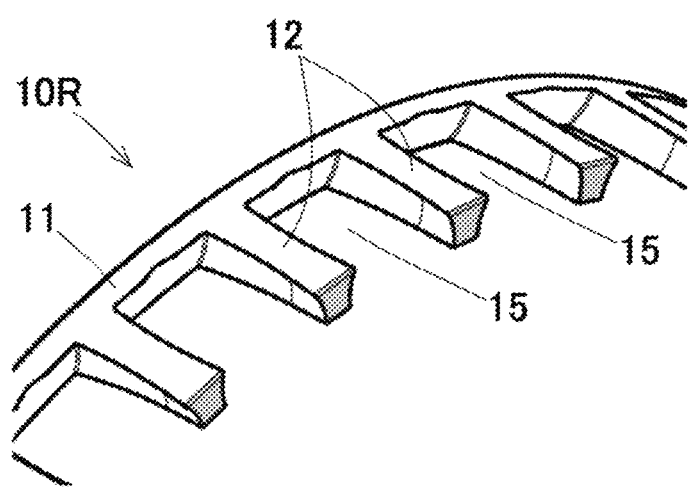
FIG. 19 is a partial perspective view of a variant of the retainer.
Figure 20:
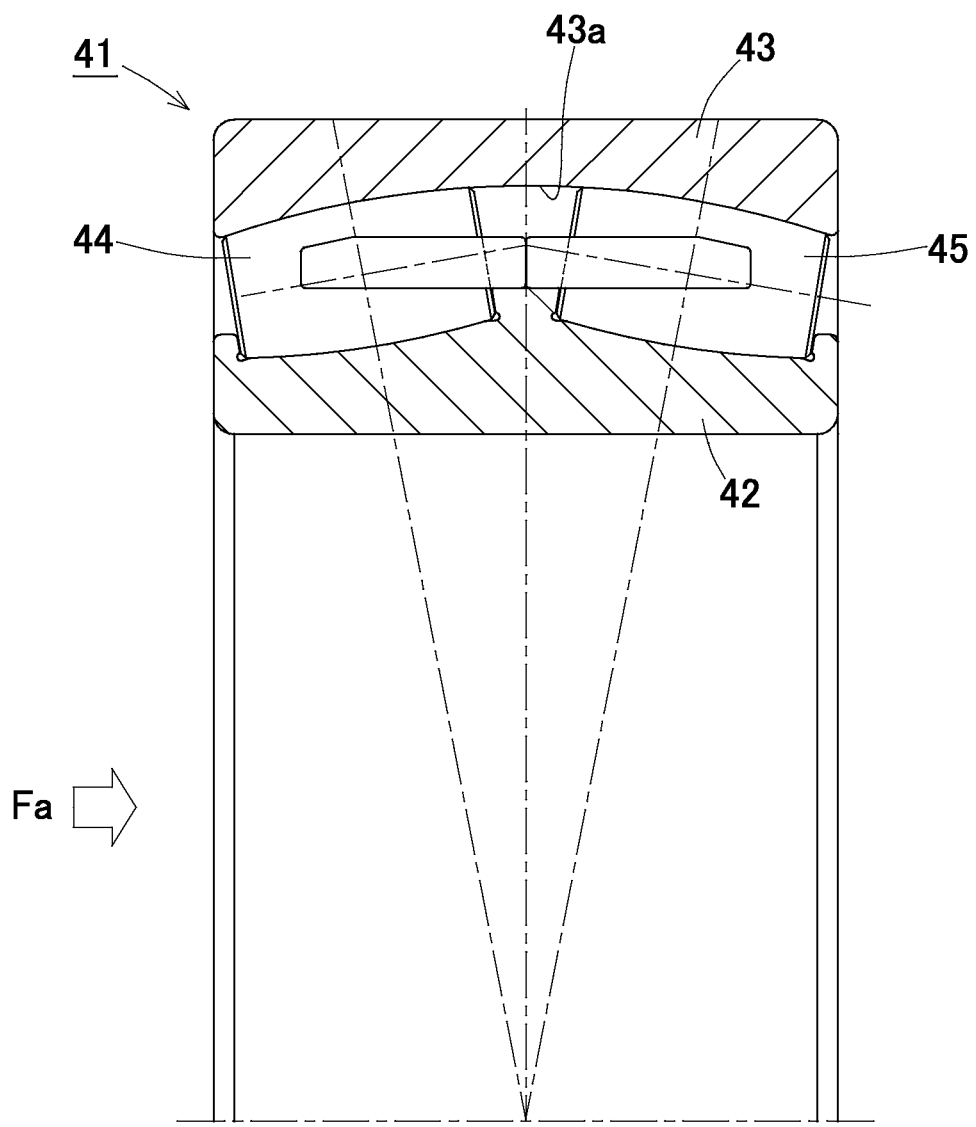
FIG. 20 is a sectional view of a conventional and general double-row self-aligning roller bearing.

These retainers 10L, 10R may be shaped without the tapered portions 13 at the tip ends of the pillar portions 12, for instance, as in the example illustrated in FIG. 19, or may be shaped such that the center line C2 of the cylindrical surface defining each pocket surface 12a is not inclined with respect to the direction of extension of the pillar portions 12.

Although the present invention has been fully described in connection with the embodiments thereof, the embodiments disclosed herein are merely examples in all respects, and are not to be taken as limiting the scope of the present invention in any way whatsoever. The scope of the present invention is to be determined by the appended claims, not by the above description, and is intended to include any change made within the scope of claims or equivalent thereto.

REFERENCE NUMERALS 1, 1A, 1B ... Double-row self-aligning roller bearing
2 ... Inner ring
3 ... Outer ring
3a ... Raceway surface
4, 5 ... Roller
6, 7 ... Small flange
8 ... Intermediate flange
9 ... DLC coating
11 ... Annular portion
12 ... Pillar portion
13 ... Tapered portion
15 ... Pocket
26 ... Main shaft
A1, A2 ... Center of the roller length
B ... Bearing width
B1, B2 ... Distance in a bearing width direction from a bearing end face
to an intersection of lines of action
D1max, D2max ... Maximum diameter
E1, E2 ... End face of the bearing
L1, L2 ... Length of the roller
P ... Intersection of lines of action
$\theta1, \theta2$ ... Contact angle

What is claimed is:

1. A double-row self-aligning roller bearing comprising:
an inner ring;
an outer ring having a spherical raceway surface; and
a plurality of rollers arranged in two rows in a bearing width direction and interposed between the inner ring and the outer ring, each of the rollers in the two rows having an outer peripheral surface having a cross-sectional shape matching the raceway surface of the outer ring,
wherein
a ratio of a contact angle $\theta1$ of the rollers in one of the rows to a contact angle $\theta2$ of the rollers in the other of the rows falls within a range of $0.25 \leq \theta1/\theta2 \leq 0.5$, and
a ratio of a distance B1 in the bearing width direction from an end face of the bearing on a side of the one of the rows to an intersection of two lines of action defining the contact angles of the two rows, relative to a distance B2 in the bearing width direction from an end face of the bearing on a side of the other of the rows to the intersection falls within a range of $0.5 \leq B1/B2 \leq 0.6$.

2. The double-row self-aligning roller bearing as claimed in claim 1, wherein a ratio of a length L1 of the rollers in the one of the rows to a length L2 of the rollers in the other of the rows falls within a range of $0.9 \leq L1/L2 \leq 1.0$.

3. The double-row self-aligning roller bearing as claimed in claim 1, wherein an inclination angle $\beta2$ of a retainer that retains the rollers in the other of the rows has a relation, relative to a roller maximum diameter angle $\alpha2$ that is an inclination angle of the rollers in the other of the rows at a point where each of the rollers in the other of the rows has a maximum diameter, expressed by an inequation: $0 \leq \beta2 \leq \alpha2$.

4. The double-row self-aligning roller bearing as claimed in claim 1, wherein each of the rollers has an outer peripheral surface coated with a DLC coating having a multi-layered structure;
the DLC coating has a film thickness of 2.0 μm or greater;
a base material of each of the rollers has a surface roughness of $Ra \leq 0.3$ and a root-mean-square gradient $R\Delta q \leq 0.05$ on an outer surface of the base material; and
the DLC coating having the multi-layered structure includes layers each having a film hardness, the film hardness stepwisely increasing toward an external-side layer.

5. The double-row self-aligning roller bearing as claimed in claim 1, wherein the double-row self-aligning roller bearing is used for supporting a main shaft of a wind turbine generator.

* * * * *

UNITED STATES PATENT AND TRADEMARK OFFICE
CERTIFICATE OF CORRECTION

| | |
|---|---|
| PATENT NO. | : 11,306,776 B2 |
| APPLICATION NO. | : 17/071368 |
| DATED | : April 19, 2022 |
| INVENTOR(S) | : Kazumasa Seko et al. |

It is certified that error appears in the above-identified patent and that said Letters Patent is hereby corrected as shown below:

On the Title Page

Item (63) Column 1, Line 2, delete "Apr. 7, 2019." And insert --Apr. 17, 2019.--

Signed and Sealed this
Seventh Day of June, 2022

Katherine Kelly Vidal
*Director of the United States Patent and Trademark Office*